(12) United States Patent
Nobileau

(10) Patent No.: US 8,069,900 B2
(45) Date of Patent: Dec. 6, 2011

(54) COMPOSITE TUBULAR STRUCTURE

(76) Inventor: Philippe Constant Nobileau, Villefranche sur Mer (FR)

( * ) Notice: Subject to any disclaimer, the term of this patent is extended or adjusted under 35 U.S.C. 154(b) by 431 days.

(21) Appl. No.: 11/953,335

(22) Filed: Dec. 10, 2007

(65) Prior Publication Data
US 2008/0110616 A1    May 15, 2008

Related U.S. Application Data

(63) Continuation-in-part of application No. 10/416,773, filed as application No. PCT/FR01/03091 on Oct. 8, 2001, now Pat. No. 7,490,676, application No. 11/953,335, which is a continuation-in-part of application No. PCT/IB2006/052738, filed on Aug. 8, 2006.

(60) Provisional application No. 60/239,011, filed on Oct. 6, 2000.

(30) Foreign Application Priority Data

Aug. 8, 2005 (FR) ...................... 05 08438

(51) Int. Cl.
*E21B 19/22* (2006.01)
*E21B 43/10* (2006.01)

(52) U.S. Cl. ...................... 160/380; 166/207; 166/242.2

(58) Field of Classification Search ................... 166/380, 166/242.3, 242.2, 207, 277
See application file for complete search history.

(56) References Cited

U.S. PATENT DOCUMENTS

| | | |
|---|---|---|
| 3,104,703 A | 9/1963 | Rike |
| 5,794,702 A | 8/1998 | Nobileau |
| 7,225,875 B2 | 6/2007 | Steele |
| 2002/0033554 A1 * | 3/2002 | Heagy et al. .................. 264/269 |

FOREIGN PATENT DOCUMENTS

EP    0952305    10/1999

* cited by examiner

*Primary Examiner* — Giovanna Wright

(57) ABSTRACT

Pipe-in-pipe composite tubular structure having between layers a hardenable filling material associating the layers to enhance the structure mechanical performance mostly in collapse. Prior to harden the filling material, the composite tubular structure can be longitudinally deployable between a folded configuration and a deployed configuration, and has a radial dimension increasing between the folded configuration and the deployed configuration. Such structure is well fitted to be used in oil-well downhole structure and casings or underwater pipeline/flowline.

18 Claims, 12 Drawing Sheets

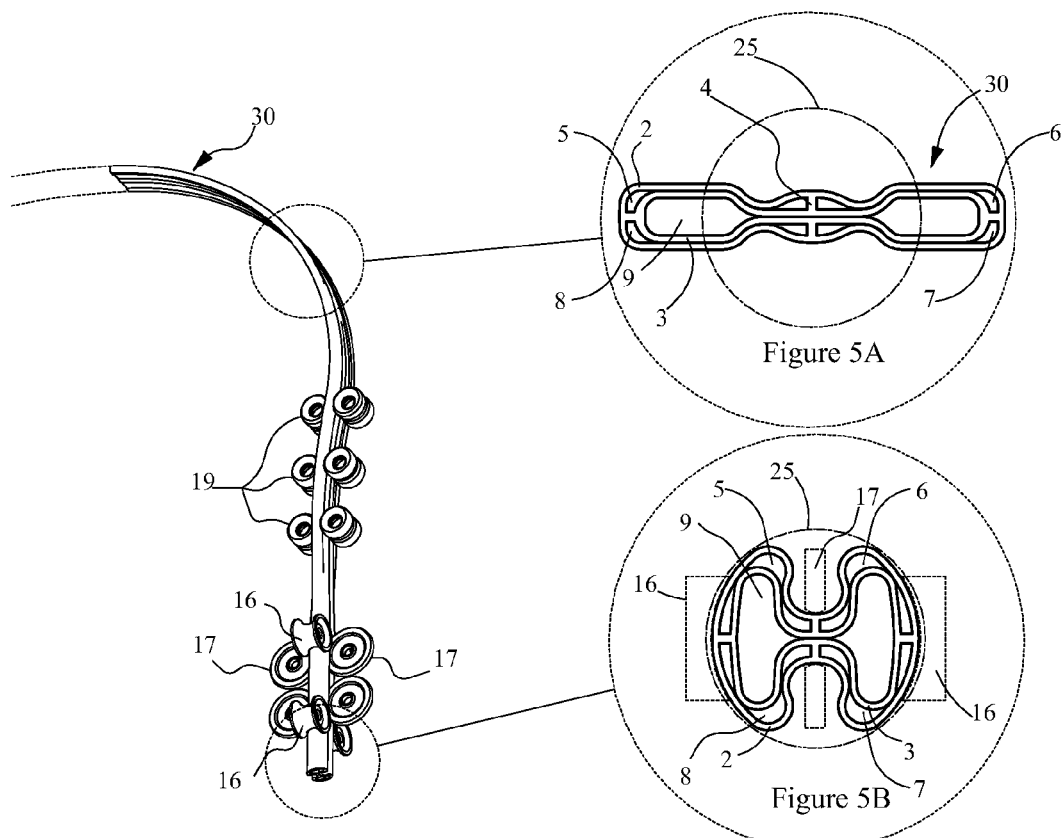
Figure 5
Figure 5A
Figure 5B
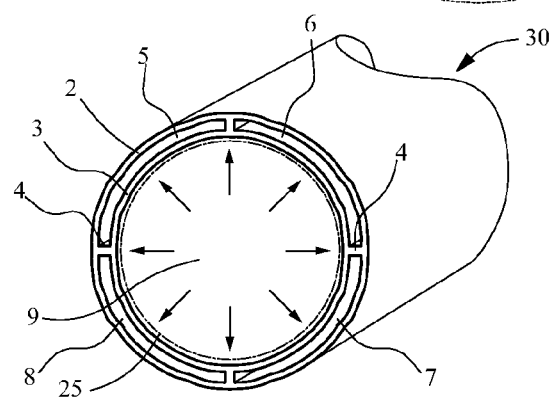
Figure 5C
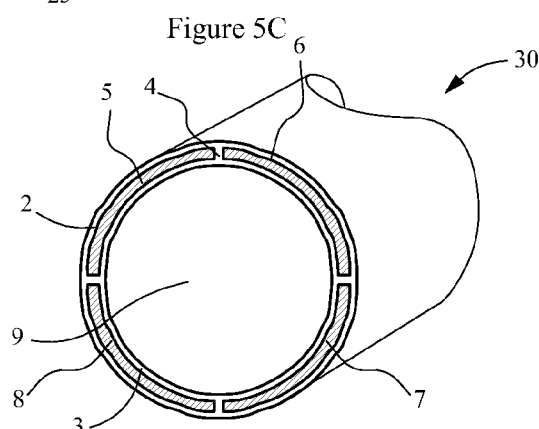
Figure 5D

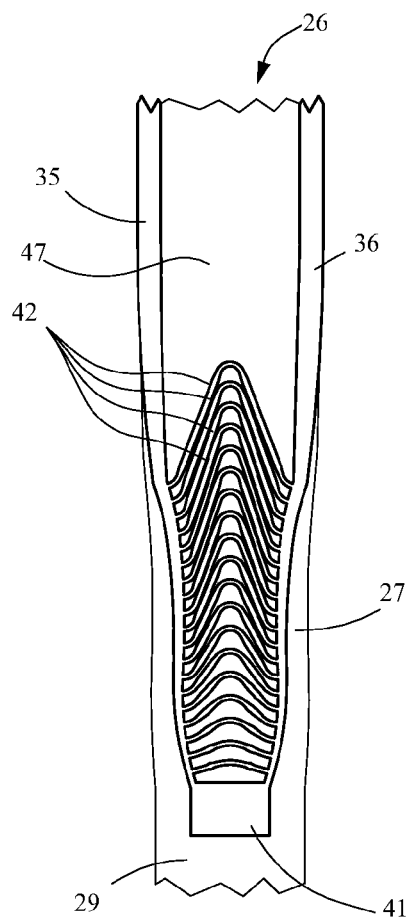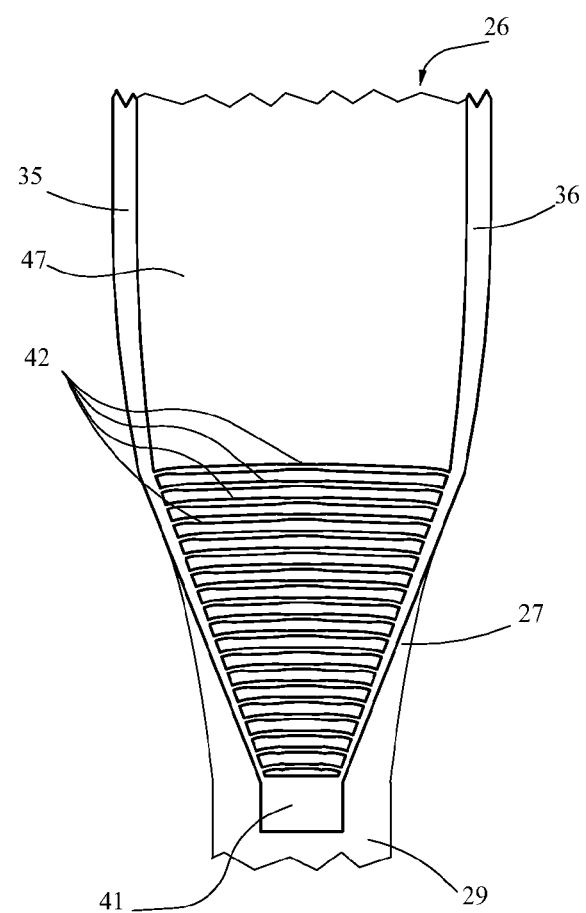
Figure 10AFigure 10B

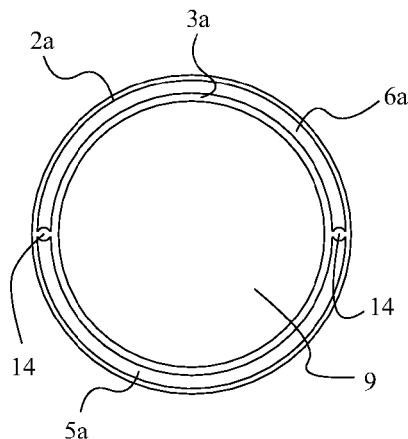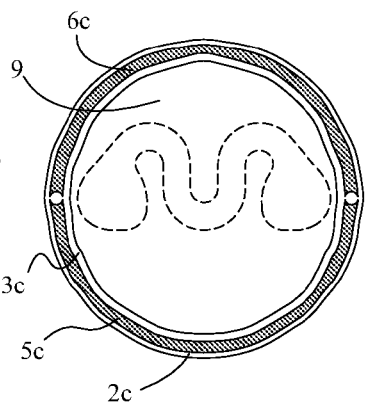
Fig 13A  Fig 13B  Fig 13C
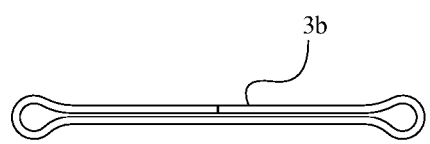
Fig 14A
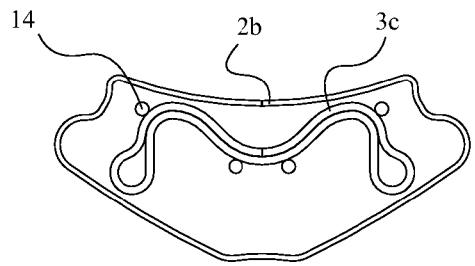
Fig 14B
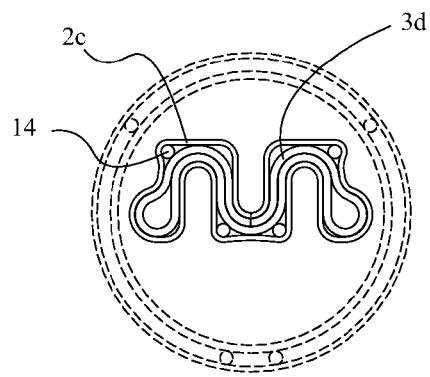
Fig 14C

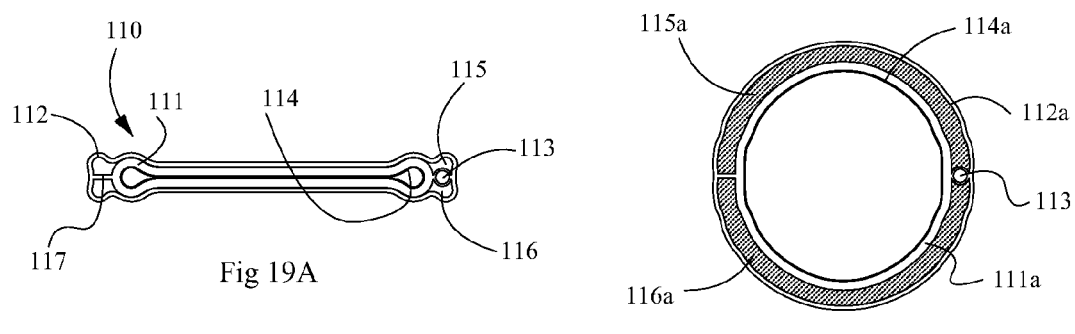
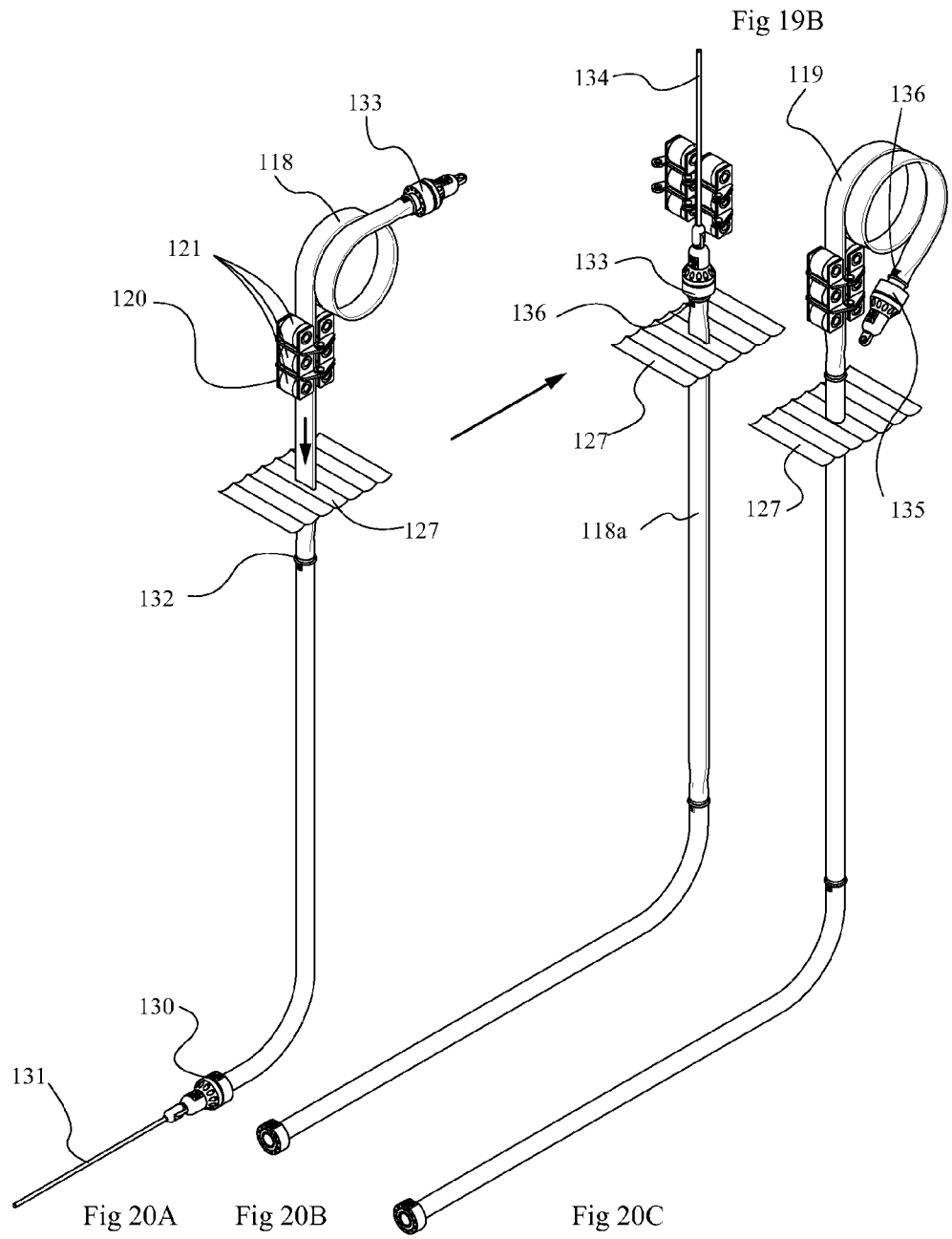

COMPOSITE TUBULAR STRUCTURE

CROSS-REFERENCE TO RELATED APPLICATION

This application is a continuation in part of application Ser. No. 10/416,773 filed Oct. 8, 2001 and a continuation in part of application PCT/IB2006/052738 filed Aug. 8, 2006 having a priority application FR0508438 filed Aug. 8, 2005. The entire disclosures of the prior applications are incorporated herein by this reference.

TECHNICAL FIELD

The present invention relates to well casing and oil transportation pipeline and in particular tubular structures requiring mechanical performances enhancement in-situ or after installation.

BACKGROUND ART

New methods for installation of tubular structures in well have recently been introduced like mono-diameter/mono-bore casing systems but have reduced mechanical performances, mostly in collapse resistance.

The patent application U.S. Ser. No. 10/416,772 of the applicant, offers a solution to improve the collapse resistance, but at the expense of substantial complications in the installation and without taking advantage of the complete steel section.

In addition, for well casing and for pipeline/flowline installations, a continuous tubular member is constructed by joining straight lengths of pipe on location.

An alternative solution is by winding the continuous tubular member on spools to allow to store the pipes in continuous length. This solution allows pipe transportation of continuous length saving assembling time on location.

However, beyond a certain pipe diameter, the dimensions of the necessary spool to store the pipe become prohibitive, as well as the necessary equipment for its unwinding. For instance, on offshore laying vessels, the size of the spool is such that it has to be part of the vessel and the pipe must be wound from a shore construction site close to the laying location. In well casing, the road size constraints and the requirements to locate big size spool on rigs make this solution less attractive if not impossible.

The patent U.S. Pat. No. 3,104,703 of Rike and al offers a solution to reduce the spool size by flattening the tubular lengthwise to reduce the spool diameter. The patent U.S. Pat. No. 5,794,702 of the applicant offers also a longitudinal folding of the tubular which also reduces its radial dimensions making easier to lower it into the well. However, these two solutions have the drawback of reducing the collapse resistance of the tubular.

During the installation of an underwater pipeline/flowline in deepwater, another problem comes from the angle of departure from the floating vessel of the line which is practically vertical and of the bending imposed to the line at the seafloor touch down. A common solution to this problem is to use the J-lay method, which has the disadvantage to reduce the laying speed by having to assemble section of pipe horizontally and then tilting it to be added to the vertical laying pipeline/flowline.

DISCLOSURE OF INVENTION

One purpose of the invention is to provide a composite tubular improving the performances in collapse resistance of the installed tubular for a given section of steel.

Another purpose of the invention is to provide a structure allowing to extend the domain of use of tubular spool transportation by winding pipes of large diameter on small diameter spools while delivering on location a tubular structure with high performances in internal and external pressure.

The purpose of the invention is to form a pipe-in-pipe composite tubular structure by interposing between layers a hardenable material associating structurally the layers. This increases the structural wall thickness of the tubular structure, increasing the wall capacity to withstand local bending and in consequence improving collapse resistance under external pressure. The hardenable material can be based on cement, thermosetting organic polymer, frozen water, etc. Once in the solid state, this hardenable material allows to have both layers cooperating to resist bending moments and provide good performances in collapse resistance or resist other outside loadings.

Another purpose is a pipe-in-pipe composite tubular structure, longitudinally deployable between a folded configuration and a deployed configuration having a radial dimension increasing between the folded configuration and the deployed configuration, and having at least a portion of the wall comprising two separated layers bordering at least an intermediate cavity. This structure is characterized by the fact that the intermediate cavity increases the thickness of the wall substantially during the structure's deployment, and this intermediate cavity is filled with a hardenable material which will harden after the structure deployment.

Due to the multiplicity of layers, it also improves, the insulating characteristics of the tubular structure, which can be of particular interest for pipeline/flowline applications in deepwater. In these types of application, the intermediate cavities can also contain small diameter lines permitting circulation of a heating fluid to prevent hydrate formation.

Another advantage of the invention is that for a given resistance to collapse, it uses thin layers of steel, so that the metallic structure formed by the layers can easily be plastically folded with a small radius of curvature while maintaining a reasonable level of strain. This foldable easiness allows to construct a structure easily deployable in situ prior to hardening of the material filling the intermediate cavities between the layers.

A further advantage is the capability of the tubular structure to be installed through a tubular structure having the same deployed diameter being known for wellbore casing as MonoBore or MonoDiameter casing system.

A last, an additional advantage of the invention is a better use of the steel material which is located on the skin of the sandwich structure formed with the filling hardened material acting as the core of the sandwich structure. This provide some weight advantage beneficial to the transportation and deployment as well as economic advantages due to the high price of steel these days.

BRIEF DESCRIPTION OF DRAWINGS

The purposes, objects and characteristics of the invention will be more apparent after reading the description which follows referring to the drawings in which.

The FIG. 5 is an isometric view of the injector of a wound casing.

Figure 6A:
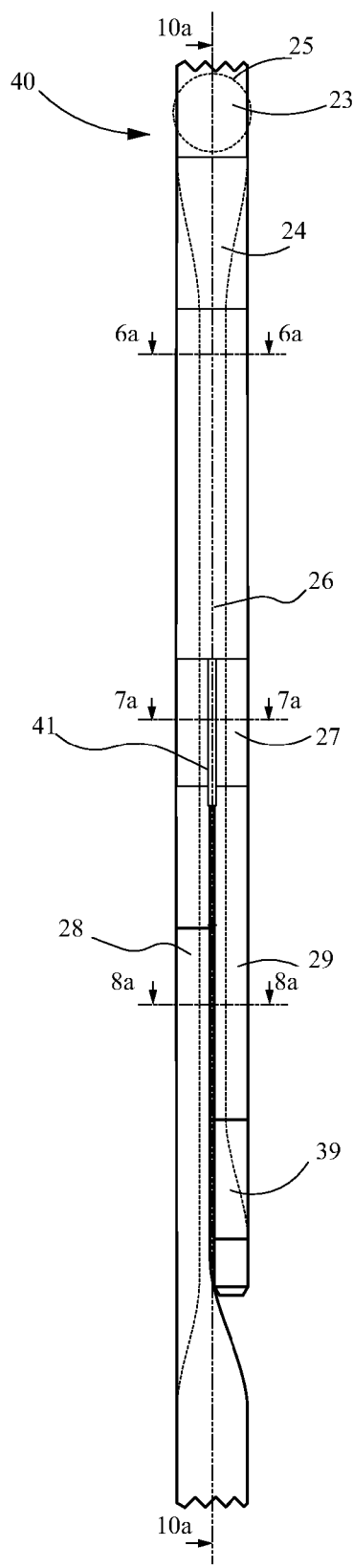
Figure 6B:
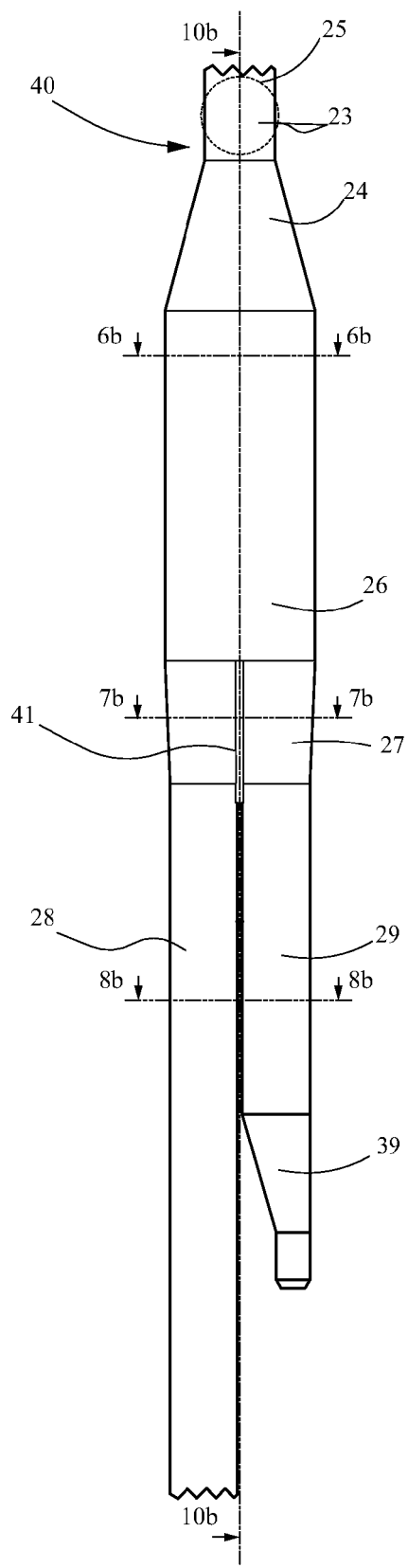
Figure 7A:
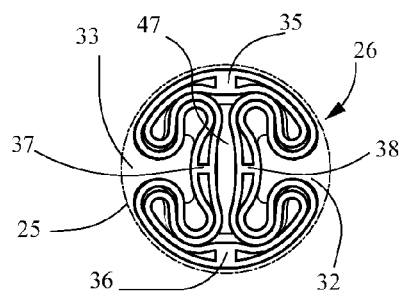
Figure 7B:
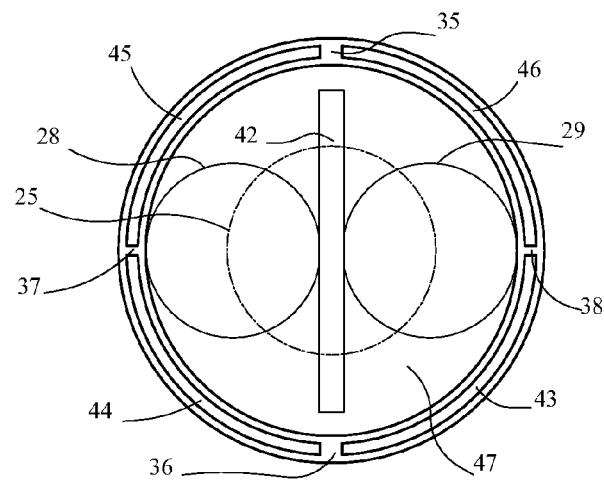
Figure 8A:
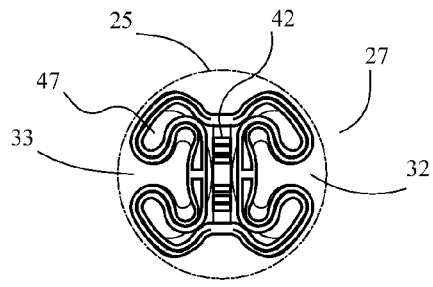
Figure 8B:
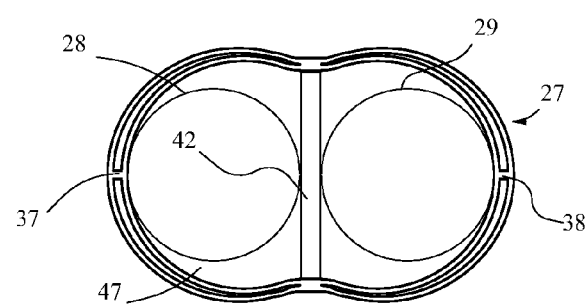
Figure 9A:
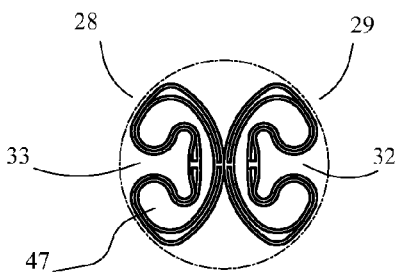
Figure 9B:
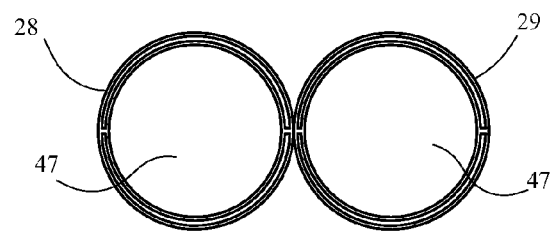

FIGS. 5A, 5B, 5C and 5D are sections of casing during the successive stages of deployment according to a third embodiment, The FIG. 6A is a side view of a multilateral junction in its folded configuration, The FIG. 6B is a side view of a multilateral junction in its deployed configuration, FIGS. 7A and 7B are cross-sectional views of the junction's body before and after deployment respectively illustrated on FIGS. 6A and 6B, FIGS. 8A and 8B are cross-sectional views of the junction's pants before and after deployment respectively illustrated on FIGS. 6A and 6B, FIGS. 9A and 9B are cross-sectional views of the junction's legs before and after deployment respectively illustrated on FIGS. 6A and 6B, FIGS. 10A and 10B are longitudinal sections of the junction's pants before and after its deployment.

FIGS. 11A to 11D are sections of the junction's body illustrating the sequence of crushing under a mechanical press.

FIGS. 12A to 12D are sections of the junction's legs illustrating the sequence of crushing under a mechanical press.

FIGS. 13A to 13C are alternative sections of casing during the manufacturing from circular pipe, reeling and deployment according to the second embodiment.

FIGS. 14A to 14C are alternative sections of casing during the manufacturing from prefolded pipe, reeling and deployment according to the second embodiment.

Figure 15:
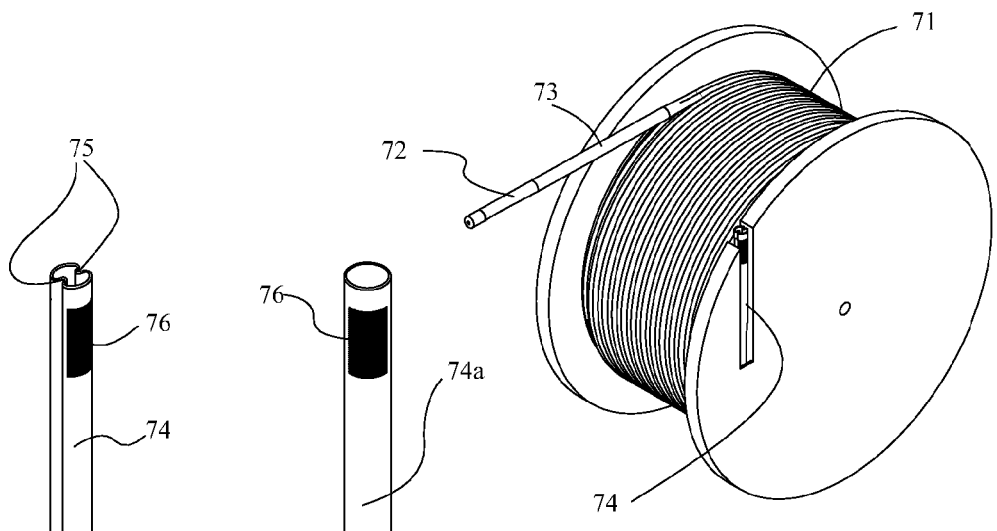

FIG. 15 is an isometric view of a length of casing reeled on a reel.

Figures 16A, 16B, 16C:
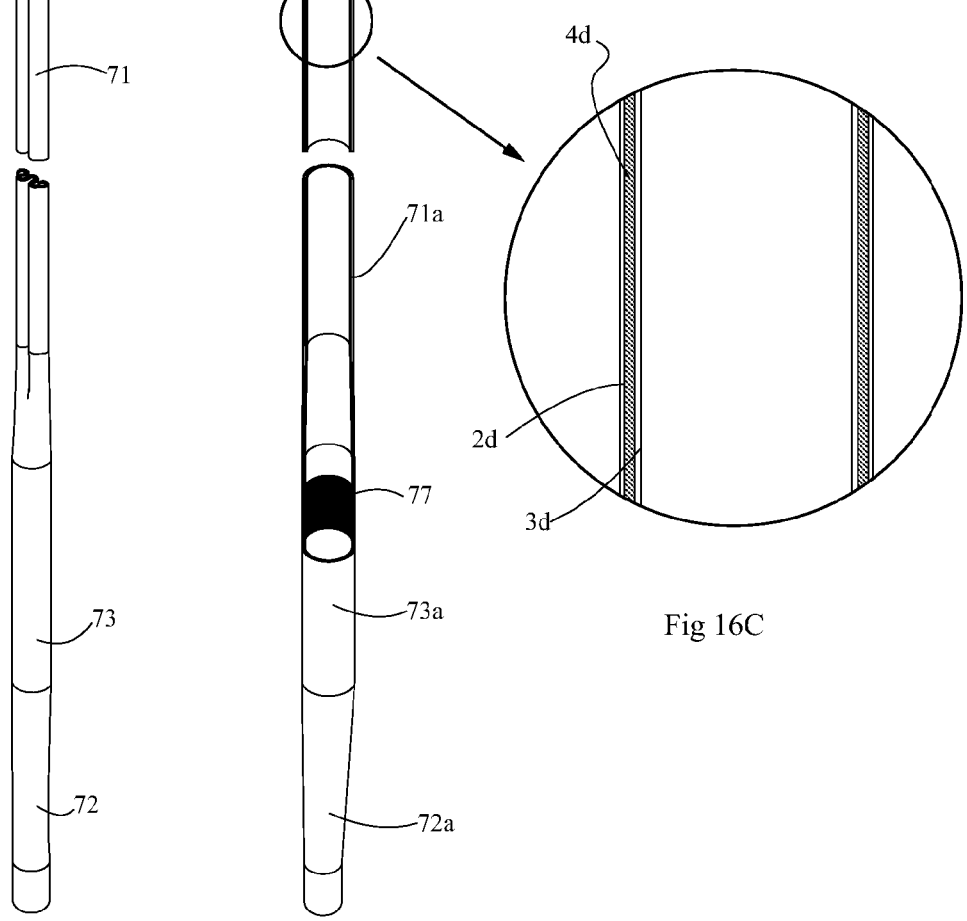

FIGS. 16A and 16B are isometric views of the length of casing straightened/folded and inflated.

FIG. 16C is enlarged view of the intermediate section of FIG. 16B.

Figures 17A, 17B, 17C:
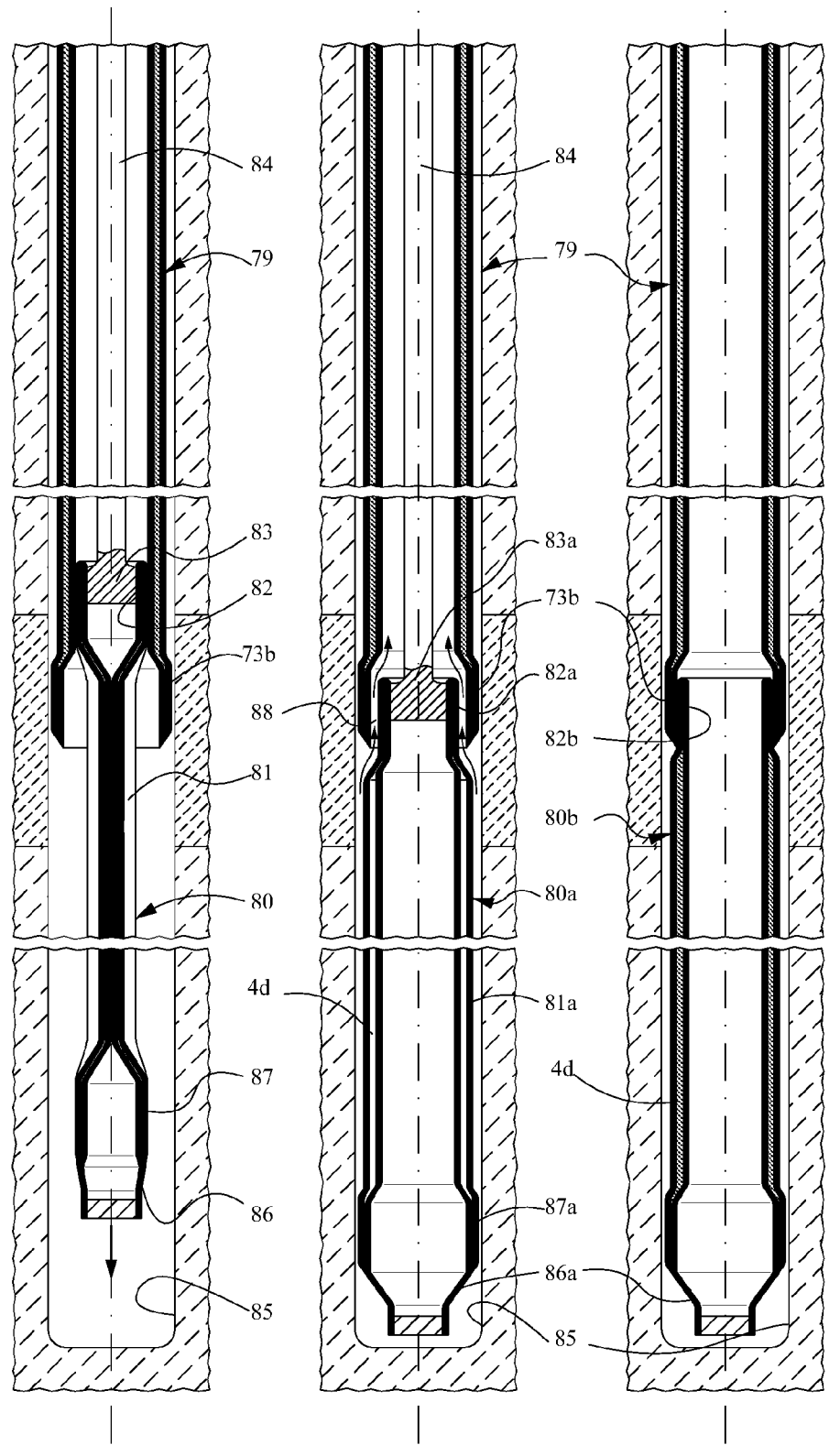

FIG. 17A to 17C are sectional views of a well cased with a mono-diameter tubular structure of the second embodiment of the invention.

Figures 18A, 18B, 18C:
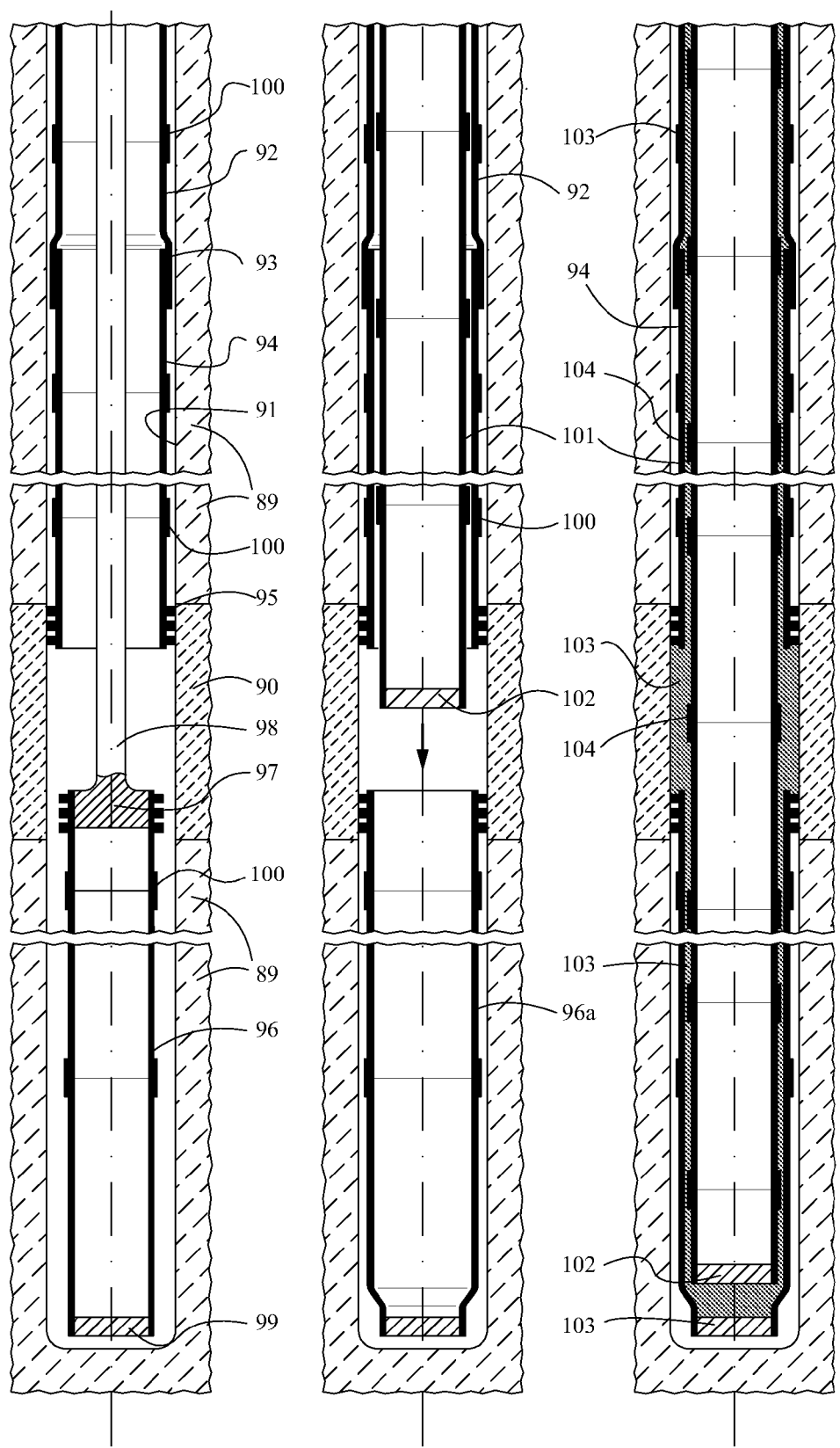

FIG. 18A to 18C are sectional views of a well cased with an alternative to construct a composite tubular structure of the invention.

FIGS. 19A and 19B are alternative sections of pipeline/flowline reeled and deployed.

FIG. 20A to 20C are isometric views of a pipeline/flowline laying using the composite tubular structure of the invention.

DETAILED DESCRIPTION

It is to be understood that the tubular structure described here comprises any tubular structure not having to be straight and possibly having a variable section. For instance, the tubular structure can have a conical portion or create a pipe embranchment as it is the case in a junction from which a main pipe splits into two or several pipes.

To make the understanding of the following description easier, we will use the term longitudinal when it is parallel to the direction of the tubular structure, and the term radial to indicate that it is somewhat in the plan perpendicular to the direction of the tubular structure. For casing applications, acknowledging that the string went down in the well vertically, we will use top, bottom, downward, upward, upper or lower.

Figure 1A:
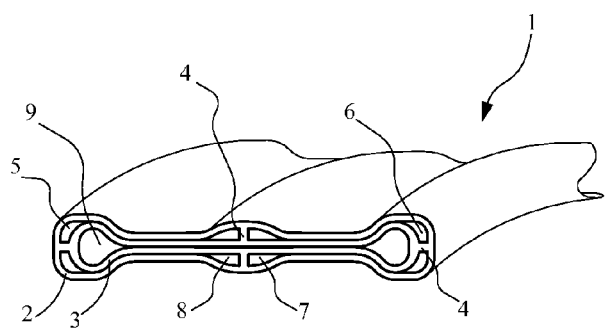
FIGS. 1A, 1B and 1C are isometric sections of pipeline/flowline during the successive stages of deployment according to a first embodiment.
Figure 1B:
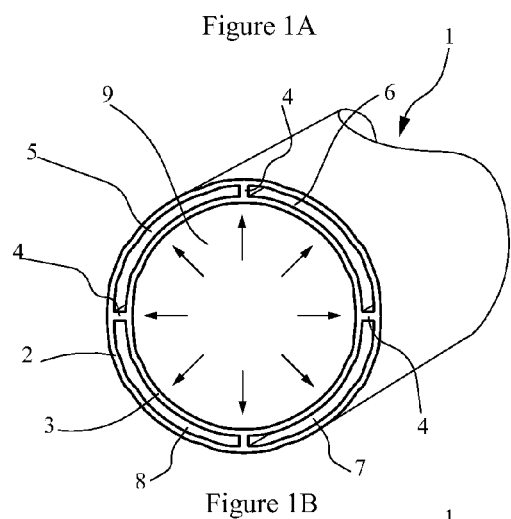
Figure 1C:
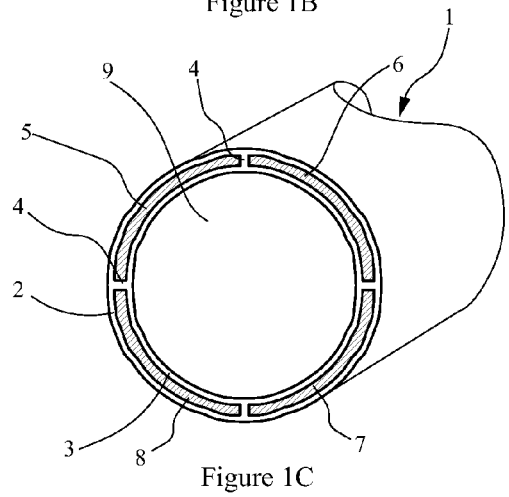

A first embodiment is represented in reference to FIGS. 1A, 1B and 1C. The installation of a structure, which could either be a pipeline/flowline or a downhole casing as in the present description, starts from a multi-layered structure 1 in a longitudinally flattened shape (FIG. 1A). The multi-layered structure 1 which will most often be metallic includes a wall composed of a internal layer 3 and a external layer 2 of identical thickness, each pressed against one another and linked up by four bulkheads 4. Under a longitudinal flattened shape, the section of the structure is optimized to minimize its folding inertia on one radial axis to be easily wound on a spool of small diameter.

The internal layer 2 isolates an internal volume 9 and along with the external layer 3 and the four bulkheads 4, isolate four intermediate cavities 5, 6, 7 and 8.

The volume 9 corresponds to the internal volume of the tubular structure while the intermediate cavities 5, 6, 7, 8 allow the circulation of fluid between both structural layers. The cavities 5, 6, 7, 8 and volume 9 are filled with fluid such as water during the laying offshore or the lowering into the well of the tubular structure in order to prevent collapse of the structural layers 2 and 3 due to raising outside pressure. The manufacture of multi-layered metallic structure 1 in its initial shape can be accomplished by fabricating the structure in a cylindrical shape first (as in FIG. 13A) then by crushing it within the plastic range of the metal under a mechanical press or set of rollers to give the required section. A heat treatment can be advantageously used after this crushing so as to eliminate the residual stresses resulting from the cold working deformation of the fabrication and/or flattening.

Once the metallic structure has been installed in situ, it is deployed in a substantially cylindrical shape by applying internal forces. Preferably the internal forces are generated by fluid pressure inflating the structure (FIG. 1B). The pressurized fluid is injected into the volume 9 to deploy the internal structural layer 3. The volume 9 and the cavities 5, 6, 7 and 8 can communicate through a pressure relief valve, so that the pressurized fluid is also transmitted to the cavities 5, 6, 7 and 8 but with a lower pressure, because this pressure will be subtracted to the internal pressure of the volume 9 so that both structural layers 2, 3 are subjected to similar internal pressure differentials. A pressure relief valve (not shown) between the cavities 5, 6, 7 and 8 and the outside could also be located to limit differential pressure across the structure and avoid bursting of one of the structural layers. These valves will be advantageously located on the running tool used to run and deploy the deployable tubular structure in place.

Once the metallic structure takes a substantially cylindrical shape, a cement slurry or alternative hardenable material is circulated between layers through cavities 5, 6, 7 and 8 (FIG. 1C). The cement slurry can be circulated in cavities 5, 6, 7 and 8 at the same time or alternatively using some cavities as return path by connecting them at the end of the pipe. Moreover, the pressure in the cement slurry will be able to contribute to the deployment of the metallic layers.

Figure 2A:
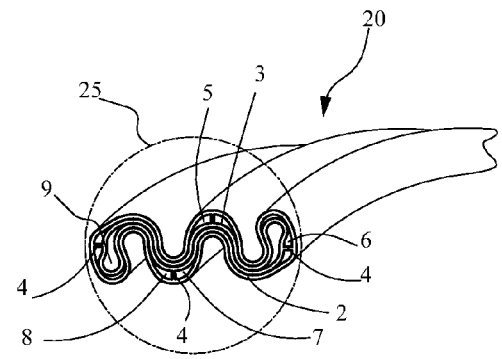
FIGS. 2A, 2B and 2C are isometric sections of casing in monobore/monodiameter configuration during the successive stages of deployment according to a second embodiment.
Figure 2B:
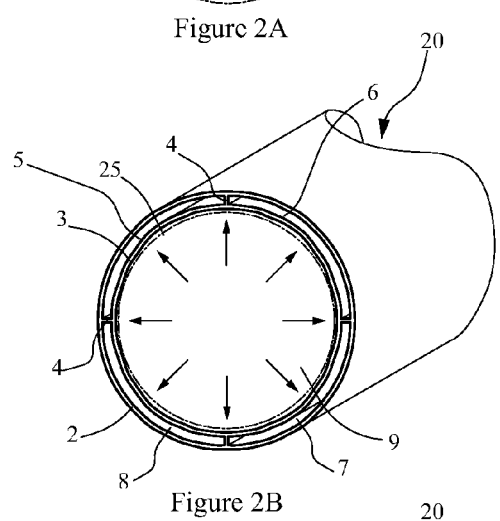
Figure 2C:
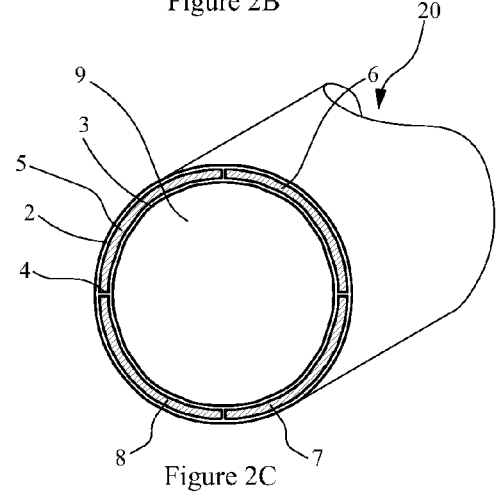

A second embodiment is represented referring to FIGS. 2A, 2B and 2C and illustrate the use of the principle of the invention as wellbore casing and particularly for mono-diameter casing. As before (FIG. 1A), the deployment of this tubular structure starts from a multi-layered metallic structure 20 in a somewhat longitudinally folded shape. The multi-layered metallic structure 20 includes a wall composed of an internal layer 3 and an outside layer 2 of identical thicknesses, each pressed against itself and linked up by four bulkheads 4.

Under its longitudinally crushed shape, the structure folding is optimized at the same time to minimize its bending inertia in one first axis to facilitate winding on spool of small dimension but also in order that the radial dimension perpendicular to the first axis is less than the diameter of a drift circle 25 in order to be able to lower it directly into a well having a passage with a drift circle 25. The volume 9 corresponds to the internal volume of the cased well while cavities 5, 6, 7 and 8 allow the circulation of fluid between both structural layers 2 and 3. Cavities 5, 6, 7 and 8 and volume 9 are filled with fluid such as water during lowering into the well to prevent collapse of the structural layers 2 and 3 from the increasing outside pressure with the depth.

Once the metallic structure 20 is installed into the well, it is deployed in a substantially cylindrical shape (FIG. 2B) with the aid of pressurized fluid so that the internal layer 3 has all its internal radial dimensions larger or equal to the drift diameter 25 according to the running process previously described.

Once the metallic structure 20 is deployed in a substantially cylindrical shape, a cement slurry is circulated between layers in cavities 5, 6, 7 and 8 (FIG. 2C) also according to the running process previously described.

Alternatively the number of intermediate cavities can be reduced and the thickness of the structural layers 2, 3 can be substantially different.

FIG. 13A to 13C illustrate an alternative to the second embodiment of the invention where the internal layer 3a is substantially thicker than the outside layer 2a. This allows when folded in the tight inverted W shape, as on FIGS. 13B and 14C, to reduce the collapsed folding radius by locating, in the inside part of the fold, the thinner outer layer first which accept the tightest radius of folding and then the thickest inner layer with a larger radius of curvature. The bulkheads can be replaced by rod spacers 14 or even short sticks or balls (not shown) which are not a sealed barrier between the cavities 5a and 6a. The rod spacers 14 can be simply tack welded on the layers 3a.

A third embodiment is represented referring to FIGS. 5, 5A, 5B, 5C and 5D. The deployment starts from multi-layered metallic casing structure 30 in a longitudinally flattened shape. The multi-layered metallic structure 30 includes a wall composed of an internal layer 3 and an outside layer 2 of identical thicknesses, each pressed against itself and linked up by four bulkheads 4. Under a longitudinal flattened shape (FIG. 5A), the section of the structure is optimized to minimize its folding inertia to be easily wound on a spool of small diameter. It features a radial dimensions larger than the diameter of the drift circle 25.

After unwinding and straightened by rollers 19 and before being lowered into the well, the metallic structure 30 is deformed in the plastic range of the metal by mechanical action of rollers 16 and pebbles 17 which apply a lateral pressure directly over the structural layer 2 and indirectly over the structural layer 3 so that its radial dimensions is reduced to fit the drift circle 25 (FIG. 5B). While rollers 16 press the metallic structure 30 laterally, the pebbles 17 maintain in contact the internal walls along the perpendicular crushing axle. Due to the possibility of maintaining a strong pressure on the tubular structure by contacting the internal walls, pebbles 17 can also transmit tension to the casing, as for instance to carry off the casing weight.

Once the deployable casing is lowered into the well, it is deployed in a substantially cylindrical shape (FIG. 5C) by pressurised fluid inflation, so that the internal layer 3 has all its internal radial dimensions larger or equal to the diameter of the drift circle 25.

Once the metallic structure 30 is deployed in a substantially cylindrical shape, a cement slurry and/or a polymer resin is circulated between layers in zones 5, 6, 7 and 8 (FIG. 5D) according to the running process previously described.

Figure 3A:
FIGS. 3A and 3B are respectively sections of pipeline/flowline in the initial configuration and in the final configuration.
Figure 3B:
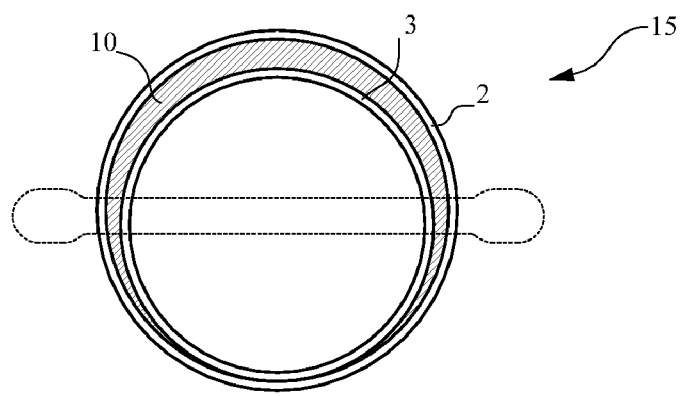

Other embodiments of the tubular wall structure of the invention can be considered using the principle of the invention. For instance, referring to FIGS. 3A and 3B, both structural layers external 2 and internal 3 of the tubular structure 15 can be separated from one another with or without any spacing device, but they will be permanently attached at least at one point along the length of the structure to prevent any substantial longitudinal differential displacement of the structural layers 2 and 3 during deployment. The advantage of such configuration is the easiness of manufacturing. In this case, after deployment, the cavity 10 filled with cement will not be of constant thickness around the periphery of the structure. Nevertheless, the collapse resistance and thermal insulation will however be higher than the equivalent single layer structure.

Figure 4A:
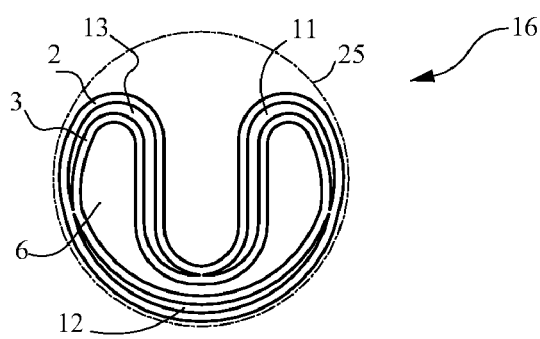
FIGS. 4A and 4B are respectively sections of casing in monobore/monodiameter configuration of lowering into the well and in the final configuration downhole.
Figure 4B:
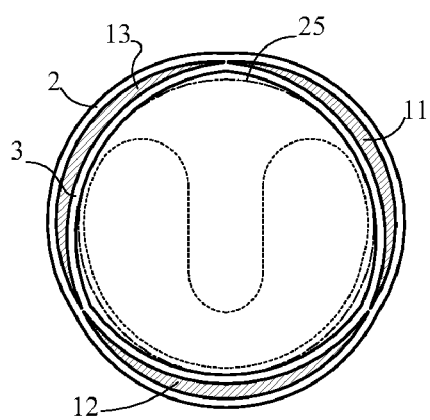

Alternatively, both structural layers external 2 and internal 3 can be mutually merged in one or several points. In the example of FIGS. 4A and 4B, the structural layers are merged in three points so as to delimit three intermediate cavities 11, 12 and 13 forming so the equivalent of three beams which assembled together can resists efficiently to collapse pressure.

Additionally, by keeping with the principle of the invention, cement slurry can be placed before deploying the structure. It requires that the volumes of the intermediate cavities are equal before and after deployment, as it is the case for instance for the cavities 11, 12 and 13 of the FIGS. 4A and 4B.

Manufacture of the tubular structure could be made by welding available straight length of metal pipe corresponding to the internal structural layer to form a first sealed pipe, then by threading and welding straight length of metal pipe corresponding to the outside structural layer. Spacers will sometimes be installed between the pipes which will be able to create in certain cases more or less sealed bulkheads between the intermediate cavities. In case no spacer are placed, and the inner layer end-up totally offset to one side of the outer layer, a substantial increase in collapsed is nevertheless achieved with the hardened material located between the pipe-in-pipe cavity.

In the case continuous length of deployable tubular structure will be necessary, the manufacture could be combined with known techniques of ERW continuous pipe manufacturing by associating on the same production line two continuous pipe manufacturing units generating the pipe, by deformation of a metal strip under rollers and pebbles and closing the tube so formed by electrical welding. Between both continuous pipe manufacturing units, spacer strips will be able to be added by electrical welding. Before flattening such multi-layered tubular structure, a hydrostatic test of the internal pipe will be able to be accomplished between two expansible plugs connected by a tension leg to transmit from one plug to the other the pressure end effect. This testing assembly will test by section the manufactured tubular structure and will be able to move from tested length to the next by quick translation to cope with tubular structure continuous production unit speed.

So, after one length has been tested, pressure will be relieved and the cup tester type seal of the plugs retracted to move to the next length without interrupting production. Also the external pipe could be tested from the outside in a similar way. Finally, after hydrostatic test(s), the tubular structure will be able to be crushed, flat or with a specific profile, and wound on a spool. It might be necessary to accomplish a heat treatment to relieve the residual stresses from the manufacturing and the possible quenching and tempering needed to get the final mechanical properties aimed. This will be able to be done in a continuous manner on the manufacturing chain or separately in an oven when a substantial length of deployable tubular structure has been fabricated and wound.

FIG. 14A to 14C illustrate an alternative manufacturing where the ERW continuous pipe manufacturing unit does not make circular pipe but preformed inner flattened pipe 3*b*, which is then rolled to 3*c* waved shape. Then spacer rod 14 or balls are tack welded on the outside of the wavy pipe and a contoured shape 2*b* pipe is preformed around and is rolled in a somehow rectangular shape to fit inside the same tubular structure once deployed.

In this embodiment of the invention related to well casing as illustrated in FIG. 17A to 17C, advantageous solutions have been described to install a longitudinally folded tubular structure below the same deployed tubular structure by passing through it and, more importantly, to enhance the collapse resistance capability of the tubular structure by creating a pipe-in-pipe structure where the cavity(ies) between the two pipes or the two layers is (are) filled with an hardenable material.

In application Ser. No. 10/416,773 of the applicant of which the entire disclosure is incorporated herein, a complete wellbore construction casing is built from length of tubular structure run successively through the previous one.

Preferably the length of tubular structure is continuous and wound on the reel for transportation as illustrated on FIG. 15. The intermediate portion 71 which as a section as illustrated in FIGS. 2A, 5B, 13B and 14C of the length is wound on the reel 70, and the reel is constructed to allow both ends to be straight, in another words, the ends do not have to be wound. Coming out from the outer wound layer is the folded bottom bell 73 (fold not shown) that will receive the next length of tubular structure in the case the well is drilled further after the present tubular structure is installed downhole. A foldable shoe 72 made of drillable material like aluminium or composite closes the bottom bell 73. Coming out off the side of the inner wound layer is the top end 74 of the tubular structure which is housed in all or in part within the thickness of the reel flange to provide access during deployment. The top end 74 comprise the hanger for the length of tubular structure 79 and 80.

FIG. 16A illustrates the unreeled and straightened length of tubular structure according to the invention. Unreeling will be achieved through an injector unit similar to well known coiled tubing injector unit. The unit will be similar to the one illustrated in FIG. 5 except that it does not have to modify the section, only the three straigtheners/tensionners 19 are needed.

The length of tubular structure which can be as long as few thousand meters comprise, at its top end, a hanger section 74. Advantageously the diameter of the hanger section 74 is reduced by locating two folds 75, 180 deg apart. Two hanging areas 76 are located on both external section of the 8 shaped profile of the hanger section 74, to engage with a corresponding internal hanging profile 77 on the internal surface of the deployed bell (73*a* as shown on FIG. 16B) of the previously run length of tubular structure. Then the intermediate folded section links the top end 74 to the bottom end folded bell 73 which advantageously feature only one fold. Last at the bottom a folded drillable shoe 72 closes the bottom end.

FIG. 16B illustrates the deployed length of casing of FIG. 16A. Deployment will be achieved by fluid pressure. The top hanger section 74A is now round and engaged in the bell 73A of the previously run of which the shoe 72A has been drilled out. The intermediate section 71A and the bottom bell 73A are also round and the shoe 72A is deployed.

FIG. 16C illustrates a vertical section view of the intermediate section 71A where the cavity 4*d* of the pipe-in-pipe section is used to conduct the casing cement slurry to the shoe 72. After the cement sets and links the outer layer 2*d* to the inner layer 3*d* the pipe-in-pipe tubular structure exhibits a rigid sandwich wall which greatly increase the collapse resistance capability of the casing.

FIG. 17A to 17C illustrate the sequence of installation of a second length of tubular structure 80 according to the invention, in MonoBore/MonoDiameter configuration, as a liner of a previously set first length of tubular structure 79 passing through it. The previously set first length of tubular structure 79 has a bell 73B which has been drilled out while drilling the extension of the hole 85 to be cased with second length of tubular structure 80. The first length of tubular structure 79 can be of the type according to the invention and installed as a liner of another length of tubular structure with the same dimensions (not shown).

But first length of tubular structure 79 could also be of the conventional solid non expanded type installed as a first length of casing from the wellhead (not shown). MonoBore/MonoDiameter configuration permits the use of a first conventional casing from the wellhead or from a conventional liner hanger, then the successive lengths of tubular structure of the same diameter need to be expanded below the previous one using known expandable technologies. Two expandable technologies to increase the radial dimension of a tubular structure are well known today where the increase of the diameter or expansion of the tubular structure is obtain by either A) increasing the diameter of a small round tubular in the metal plastic range or B) by unfolding a longitudinally folded larger metal pipe.

In FIG. 17A, the length of tubular structure 80 is lowered through the previously set length of casing 79 on a running string 84 and running tool 83. The running tool 83 engages the hanger 82 which is the top end of the tubular structure 80. The intermediate portion 81 is folded tightly with numerous folds to feature an overall, somewhat rectangular, section compatible with reeling. The bottom end is equipped with a folded Bell 87 and a folded shoe 86.

In FIG. 17B, the length of tubular structure 80A has reached the proper depth with the hanger 82A facing the Bell 73B of the previous string 79. The hanger 82A is partially expanded to engage the hanging area 77 of the hanger (shown in FIG. 16B) with the matching hanging area of the bell 73B while leaving some flow-by section 88 for the return fluid. The intermediate portion 81A has been rounded up with pressure and also the bell 87A and shoe 86A. Then a cement slurry is pumped down the running string 84 and fed through the running tool 83A to the length of tubular structure 80A pipe-in-pipe cavity (ies) 4*d* to reach the shoe 86A. The cement can be over flooded and fill the annulus space between the length of tubular 80A and the borehole 85. Cementing of the tubular structure is not mandatory to achieve the composite tubular structure of the invention, only the cavity (ies) 4*d* must be filled with a hardenable material. During inflation and slurry circulation wellbore fluid can flow back to the surface through the flowby section 88.

In FIG. 17C, the cement has set and rigidify the wall of the tubular structure 80*b*. Prior to pull the running tool 83*a*, the hanger 82*b* is fully expanded in sealing contact with bell 73*b* achieving sealing integrity of the wellbore casing. The well is then ready to be either completed or further drilled by drilling out the shoe 86A.

As we have seen, the use of tubular structure with sandwich wall for casing a well offers many advantages but, it is requiring a dedicated construction of the tubular structure which might not be readily available everywhere immediately.

In consequence, without departing from the principle of the invention and as an alternative the composite wall casing can be built directly downhole as described below.

Referring to FIG. 18A, a well 91 has been drilled. To illustrate the possible variation we assume that the well has been drilled through sealed ground zone 90 (consolidated rock) and porous ground zone 89. The well has been cased by known solid MonoBore/MonoDiameter expandable casing with a first length of casing 92 having a bottom bell 93 receiving a second expandable casing 94 featuring a packing seal 95 at the bottom to achieve sealing arrangement with sealed ground zone 90. A third length of casing 96 (not expanded yet) is shown being run on running tool 97 connected to running string 98. All these length of casing are made from the assembly of straight length of round pipe with known T/C coupling 100. Presently when T/C coupling are expanded in the plastic range, they loose their gas-tight capability.

Referring to FIG. 18B, the third length of casing 96a has been expanded and the top sealed to sealed ground zone 90. It will be recognized by the man skilled in the art that the presence of sealed ground zone 90 is not mandatory to achieve the composite tubular according to the invention and if sealed ground zone 90 are not considered to simplify length of casing connections, a bell type connection arrangement between first length 92 et second length 94 can be installed between second length 94 and third length 96a.

Then assuming that third length is the last casing, the well having reached the producing zone, a fourth length of casing 101 is lowered to cover the three previous lengths 92, 94 and 96a. This casing 101 could have advantageously the same manufactured size than the three others. Centralizing of the casings can be achieved with the coupling 104 protuberance featuring possibly some flow-by slits or conventional casing centralisers. Hardenable material 103 like cement is circulated between the fourth length of casing 101 preferably from the bottom up via the cement shoe 102 and the 3 previous lengths 92, 94 and 96a to built a high performance sandwich wall. Since the T/C couplings 104 of the fourth length of casing 101 have not been expanded, they retain their gas-tight capability offering a gas-tight production casing. This sandwich configuration is very advantageous because it requires only thin wall casing to be installed which are more easily set as MonoBore/MonoDiameter expandable casing reducing the percentage of strain required for their installation.

Again, cementing of the outer casing 92, 94 and 96a to the drilled hole is not necessary to achieved the High Performance capability composite tubular structure according to the invention, only the space between the inner casing 101 and the three outer casing 92, 94 and 96a must be filled with a hardenable material. In case of outer casing interruption due to the presence of consolidated ground layer 90, the sandwich structure is then achieved by using the consolidated sealed terrain as outer layer but its strength have been verified and the pollution of the cement is minimum which is not the case when the cement goes in contact with unconsolidated ground.

The principle of the invention can be advantageously used to built a deployable casing junction. Advantageously, the invention allows a casing junction to be lowered in a well having a drift circle 25 in a longitudinally folded configuration and to provide, in its deployed configuration, junction legs 28, 29 having radial dimension substantially identical to the casing diameter 23 to which the junction is connected. The relative short length of the junction allows to transport and store the junction without needing to be wound. The initial form, longitudinally folded is therefore optimised to minimize the radial size of its enlarged section.

Referring to FIG. 6A, a casing junction 40, in the longitudinally folded configuration, has all radial dimensions contained in the drift circle 25 shown in the plan of drawing for clarity. In its deployed configuration illustrated in FIG. 6B, junction 40 comprises a substantially cylindrical body 26 having a diameter larger than the diameter of the drift circle 25, an upper substantially conical section 24 to be connected to the upper casing 23 of smaller diameter, pants 27 making transition between the body 26 and substantially cylindrical legs 28 and 29 and a stiffener 41 between the legs on the pants crotch.

A sealed deployable shoe 39 is installed on one of the legs 29 to allow fluid pressure deployment.

Referring to FIGS. 7A, 8A, 9A and 10A the junction wall, in its longitudinally folded shape, includes two separate metallic layers linked up by bulkheads 35, 36, 37 and 38. The assembly includes two big folds 32 and 33 in the body 26 which extend in the pants 27 and in legs 28 and 29. The bars 42 forming the stiffener 41 in the bisecting plan of the pants are longitudinally folded (FIG. 10A) to allow the bulkheads 37 and 38 to get closer to one another.

Deployment of the junction is made by inflation with a pressurized fluid injected into the internal volume 47 and into cavities between layers 43, 44, 45 and 46 through one or several pressure relief valves. A pressure relief valve between the internal volume 47 and the outside will be installed to limit the maximum pressure in the junction and to avoid bursting in case the burst pressure of the junction would be less than the burst pressure of the casing 23.

Referring to FIGS. 7B, 8B, 9B and 10B, once the junction is deployed, the lateral dividing bulkheads 37 and 38 presents in the body extend in legs 28 and 29. The dividing bulkheads 35 and 36 meet between both legs on the stiffener in a stirrup form 41 so that the cement slurry can be injected into cavities 43, 44, 45 and 46 at the same time or alternately by making them connected by the lower end of the legs 28 and 29. Bars 42 are straightened in the bisecting plan of the pants (FIG. 10B) so that they can consequently assure the reinforcement of the pants out of roundness section in internal pressure or in collapse pressure by working respectively in traction or in compression. A device, not shown, linking up the central parts of the bars 42 would be able to allow to lock the bars 42 in their deployed position if needed to improve their buckling load in compression.

A typical running procedure to install one or more junction will be the following:

- in an open hole extension of a well, one or more cavities (not shown) will be under-reamed at the location where one or more junctions are due to be installed;
- one or more folded junctions are inserted in the casing string at the proper place with the proper orientation and the casing is lowered into the well, the bottom of the string having a conventional cement shoe and the collapsed leg 29 of each junction being equipped with sealed deployable shoe 39;
- when the string reach the proper depth, the proper orientation of the string will be given through known technique and the junction(s) will be inflated by feeding pressurized fluid into the string;
- the junction cavities are then filled and the casing string cemented;

the lateral well will then be able to be drilled out by entering the deployed leg(s) 29 by first drilling out the junction shoe 39;

a casing string will be installed in the lateral well, the connection with the junction being achieved by known techniques of liner hanger or by expanding the lateral string top into leg 29.

The casing junction can be fabricated directly in its longitudinally folded shape, but preferably, the casing junction is constructed in a configuration close to its deployed shape before being longitudinally crushed by plastic deformation under a mechanical press. FIGS. 11A to 11D represent the sequence for crushing the body 26 of junction under a mechanical press.

Figure 11A:
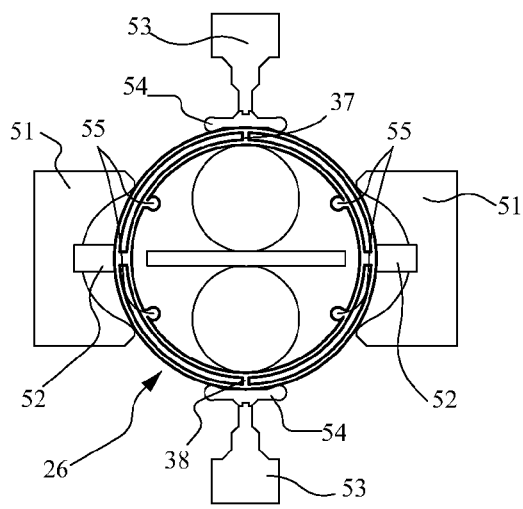
Figure 12A:
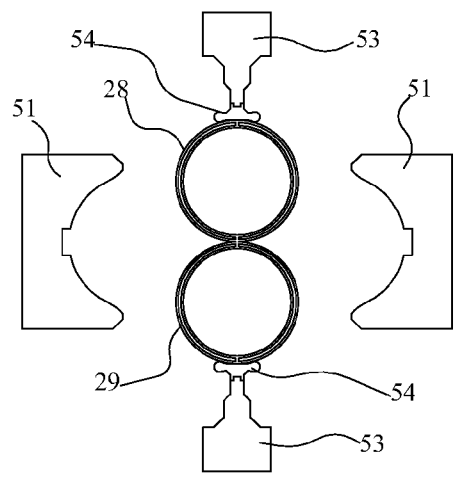

The junction body 26 is fabricated round then put in the press between the horizontal rams 51 and the vertical chucks 53 (FIG. 11A). Rams 51 are initially equipped with spacers 52 while chucks 53 are engaged in the folding forms 54 which are part of the casing junction. Rods 55 welded on the inside of the body 26 are also part of the casing junction.

Figure 11B:
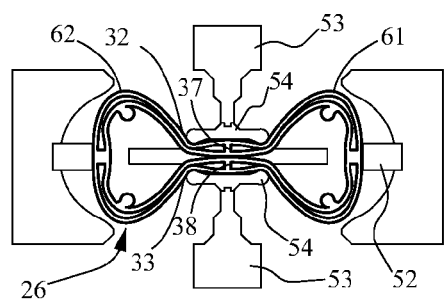
Figure 12B:
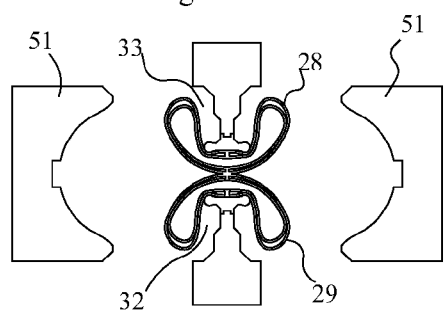
Figure 11C:
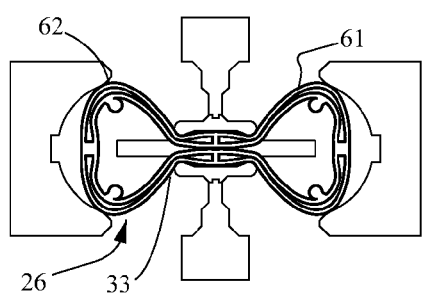
Figure 12C:
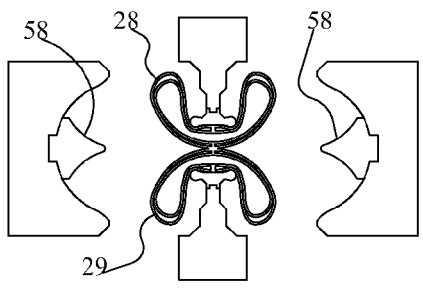

The folds 32 and 33 are formed by crushing and putting in contact the internal surface of the body 26 at the location of the dividing bulkhead 37 and 38 (FIG. 11B). This initial flattening can be achieved advantageously by maintaining a pressure inside the body 26 so as to maintain a large curvature radius on the folds 61 and 62.

Figure 11D:
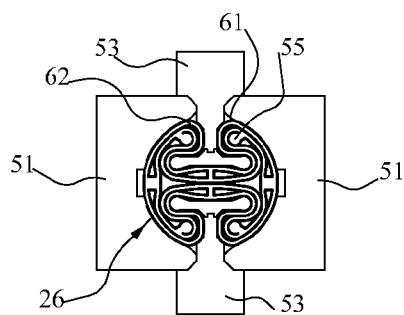
Figure 12D:
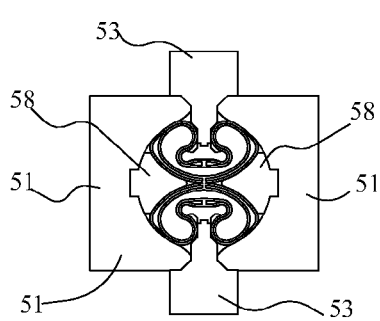

Spacers 52 are then removed (FIG. 11C) then crushing is finalized by horizontal displacement of rams 51 (FIG. 11D). During this deformation, rods 55 limit the radius of curvature of the folds at the level of the internal layer. The radius of curvature of the outside layer is then limited by the contact of the external surface of the body 26 on chucks 53. The casing junction is then removed from the press and keeps the rods 55 and the folding forms 54. The folding forms 54 can advantageously reinforce the junction structure.

Referring to FIGS. 12A to 12D, legs 28 and 29 of junction are crushed according to the same principle, in the same press and at the same time of the crushing of the body 26 using the extension of rams 51 and chucks 53. Folding forms 54 used to crush the body 26 extend on legs 28 and 29 and are also part of the junction. Before final folding on the horizontal axis, spacers 58 are added on rams 51 to avoid the deformation of the layers where the legs face one another.

It can be outlined that in all embodiments of the invention, once the cement slurry has completely filled the cavities between layers, it is left to set until its mechanical characteristics become sufficient to assure cooperation of layers to improve the resistance of the wall in flexion. During the filling material hardening period, the structure can be advantageously kept under inflating pressure.

It should be understood that the invention is not restricted to the details of the above description, so that a certain number of alternatives can be added without departing from the principle of the invention. For instance, cement can be replaced by a hardenable material, initially liquid of other origin than mineral, such as a polymer resin. Also, the material of the structure layers could be any other material having elastic with or without plastic range capability to permit in-situ deployment, the material, filling up the inter-layers cavities, by hardening, freezing the structure in the second case.

Filling of the cavities between layers separated by the hardenable material can be accomplished when the material is in a fluid state. Filling can then be accomplished by injecting the hardenable material in separated cavities between layers either downward or upward, or from one end to the other. It allows for instance to design a structure where filling and return can be done from one end, by connecting both ends of the cavities at the other end.

For wellbore casing applications, another filling mode consists in circulating the same cement between the layers and between the casing and the drilled wellbore. In this case, cement filling can be fed in the upper end of the installed casing and the exit towards the annulus space of the wellbore at the lower end by relieving the filling pressure in the annulus outside of the casing by a pressure relief valve. Hardening of the filling material intervenes after a certain delay, as for instance with materials based on cement or catalyzed resin. The hardening of the filling material of the inter-layers cavities can be speeded up also either by lowering the temperature, as for instance by using some water transformed into ice, or by raising the temperature, as for instance with a material based on polymer resin.

In addition to the sealed layers, it is possible to place additional reinforcements as fibres, rods, pipes or profiled members in the cavities between both layers which will be able to participate in the resistance of the wall when the filling material between layers is hardened. Also pipes of small diameter creating circulation path through the hardened material will allow to circulate heating fluid, in the case of deepwater pipeline/flowlines subjected to hydrate formations. These last ancillary pipes could also be welded to the structure and act as a sealed bulkhead between the layers as well.

Referring to FIG. 19A an pipeline/flowline is shown, the multi-layered steel structure of pipe, or pipe-in-pipe is longitudinally folded 11 in a flattened shape, so that the inertia is minimized on a preferential axis in order to be able to be wound on a reduced diameter spool, and on the other hand, and additionally to facilitate the laying and the underwater connections. When folded, the inner pipe 111 internal surface can be in contact on most part of it to allow the use of high capacity tensioner 120. The inner pipe can contain a thin stainless steel liner 114 to provide corrosion protection. The outer pipe 112 has also most of its internal surface in contact with innerpipe 111 outside surface to again transmit tension from tensioner 120. Bulkhead 117 can be also made with small pipe 113 which could be used to circulate a warm fluid to fight hydrate formation in cold environment oil & gas flowline/pipeline.

The flattened pipeline/flowline can be reeled easily on small size reel 118 and 119 transportable on roads as shown of FIGS. 20A and 20C (spools not shown for clarity). Cavities 115 and 116 between the pipe-in-pipe can be filed after deployment with hardening material containing insulation compound like spherical Styrofoam or other known insulating particles.

The composite tubular structure reel-able according to the invention can also found applications in land pipeline, for ease of transportation and unreeling and puling through a partially fully excavated trench. After installation at the proper location and circulation and hardening of the inter-layer material the composite tubular structure offers a good resistance to external loading. Also in some application where the weight of the steel needs to be reduced, the layers of the steel pipe-in-pipe can be relatively thin and the strength of the pipeline is obtained by filling the cavities with High Performance concrete which not only will provide strength in collapse resistance associated with the steel layer but also will provide strength in internal pressure.

In case of offshore underwater pipeline/flowline, the composite tubular structure according to the invention can be used advantageously in very deep water where J laying is normally used. In very deep water the tension is very high since the weight of the pipe in the water depth has to be supported. Also external pressure is high where the pipe touchdown which combine with the sharp radius of the curvature in the elastic range make collapse resistance capability critical. The solution is to lay the pipe full of water but this add tension. Also since the pipe is made of finite length of joint welded on the laying vessel, material grade cannot really exceed 65 ksi yield without creating difficulties to the field welding operation. Since the composite tubular structure according to the invention is of continuous length, higher yield material can be used to at least 80 ksi reducing the weight for a given tension capability . . . and in consequence reducing the tension as well. In consequence full of water laying can be done with minimal horizontal tension which in deepwater has to be generated by thrusters with high energy cost.

FIGS. 20A through 20C illustrate a specific J laying operation where the deployment of the added section from one reel is immediately deployed and the pipe-in-pipe cavities are grouted. A pulling head 130 is secured to the bottom end of the underwater pipeline/flowline with a tension cable 131 attached to a fix point (not shown). Spooled length 118 is added after a tie-in connection 132 has been made and already went underneath the water surface 127. Even if the pipe material has a yield higher than 65 ksi, the material of the Tie-in connection will be 65 ksi or less for welding practicality and also the two piped of the pipe-in-pipe will be merged to a solid thicker pipe to facilitate the tie-in. The three rollers straigthener/tensionner 120 with three sets of roller 121 maintain the pipe laying tension while the laying vessel (not shown) move forward by pressing on the flattened section. As shown on FIG. 20*b* the spooled length has another pulling head 133 with a cable 134 and a winch (not shown) to maintain the tension while the straigthener/tensionner 120 is open to let the pulling head 133 passing through. Through the cavity communication outlets 136 below the pulling head 133, the cavity are grouted with the proper hardenable material while the flattened internal pipe is inflated. Then the pulling head 133 is removed and a new spooled length 119 is added having another pulling head 135. The displacement of the laying vessel (not shown) can resume.

Generally, the composite deployable tubular structure of the invention can be advantageously used for downhole well equipment which are larger than the borehole that they have to go through, such as:

enlarged chamber like side pocket mandrel to receive downhole retrievable equipments such as pump, safety valves, etc. . . . multilateral junction, etc.;

bells for suspending next length of casing in monobore technology and any other equipment.

While the invention has been shown in some of its forms, it should be apparent to those skilled in the art that it is not so limited, but it is susceptible to various changes without departing from the scope of the invention

What is claims is:

1. High collapse resistance composite tubular structure, longitudinally deployable by fluid pressure between a folded configuration and a deployed configuration, having a radial dimension increasing between said folded configuration and said deployed configuration, having a portion of the tubular structure wall which includes at least two structural layers bordering an intermediate cavity, wherein:

said two structural layers are attached to one another in said folded configuration;

most of said structural layers are spaced apart in said deployed configuration;

said cavity is filled with a hardenable material having, once hardened in said deployed configuration, sufficient mechanical properties, for strengthening the tubular structure wall by having the said structural layers cooperating to provide high collapse resistance capability.

2. Structure according to claim 1, wherein said layers are maintained apart in at least one point by a spacer.

3. Structure according to claim 2, wherein said spacer is a sealed bulkhead.

4. Structure according to claim 1, where said cavity also includes additional reinforcement.

5. Structure according to claim 1, wherein said structure is a wellbore casing, wherein said casing, in its deployed configuration, has a drift diameter larger than the largest radial dimension of the said structure in said folded configuration.

6. Structure according to claim 1, wherein in a longitudinally folded configuration, said tubular structure is transported wound on a spool.

7. Structure according to claim 1, wherein the tubular structure is heat treated in the folded configuration.

8. Structure according to claim 1, wherein said structural layers are of different thickness.

9. Structure according to claim 1, wherein said structural layers are of metal.

10. A construction and installation method of a high collapse resistance composite tubular structure comprising the steps of:

fabricating said tubular structure with a wall of which at least a portion includes at least two structural layers permanently attached to one another in at least one location and bordering at least one intermediate cavity ;

installing said tubular structure in a longitudinally folded configuration having a transversal dimension reduced in comparison with the deployed configuration;

deploying said tubular structure by application of a fluid pressure(s);

increasing the thickness of said intermediate cavity(ies) in at least one location;

filling up said intermediate cavity with a hardenable material either before or after deployment;

hardening of the filling material contained in said intermediate cavity, said filling material, once hardened, having sufficient mechanical properties, for strengthening the wall by having said two structural layers cooperating.

11. Method according to claim 10, wherein said hardenable filling material in said intermediate cavity is put in place after deployment of said structure.

12. Method according to claim 10, wherein during transportation, said structure is wound on a spool.

13. Method according to claim 12, where said structure is a wellbore casing and wherein the diameter of internal passage of said deployed tubular structure is larger than any radial dimension of said tubular structure longitudinally folded.

14. Method according to claim 13, wherein said structure is crushed to reduce its radial dimension before going down into the well and after having been unwound from said spool.

15. Method according to claim 10, wherein simultaneously to the application of said fluid pressure in the internal volume, a lower fluid pressure is applied in one or several intermediate cavities.

16. Method according to claim 10, where said tubular structure is intended to form a pipeline or flowline and the installation or laying is accomplished prior to said deployment of said structure.

17. A method to lay a high collapse resistance composite tubular structure underwater comprising the steps of fabricating said tubular structure with a wall including a portion comprising at least two structural layers permanently attached to one another in at least one location and bordering at least one intermediate cavity;

transporting said tubular structure in a longitudinally flat configuration;

lowering the composite tubular structure underwater by applying tension from rollers pressing on the flattened tubular structure;

deploying said tubular structure by fluid pressure;

increasing the thickness of said intermediate cavity in at least one location by application of said fluid pressure;

hardening of the filling material contained in said intermediate cavity, said filling material, once hardened, having sufficient mechanical properties, for strengthening the wall by having said two structural layers cooperating to provide high collapse resistance capability.

18. Method according to claim 17, wherein said tubular structure is transported wounded on reel.

\* \* \* \* \*